Patented July 27, 1948

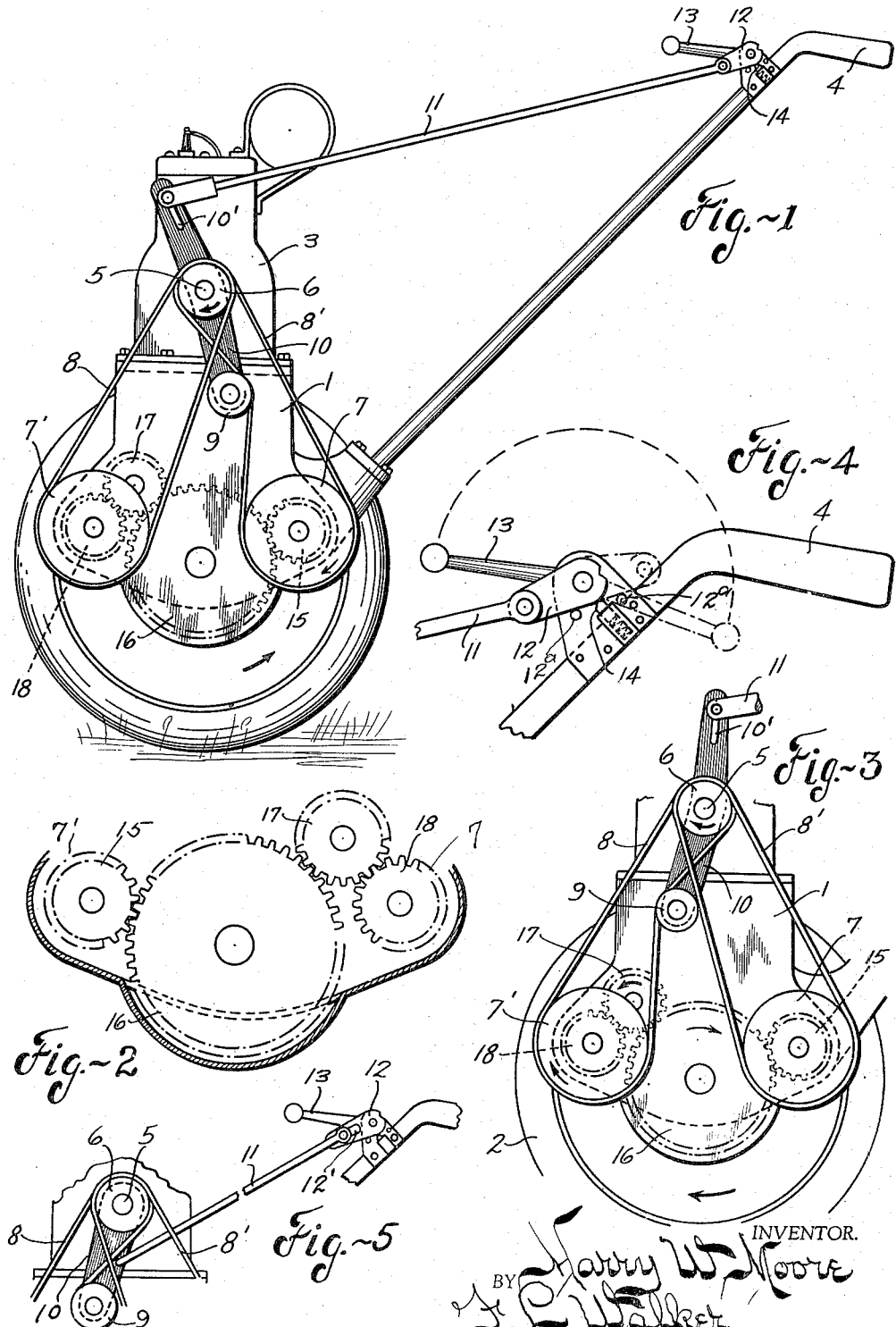

2,445,797

UNITED STATES PATENT OFFICE 2,445,797

TRACTOR DRIVE

Harry W. Moore, Dayton, Ohio

Application September 29, 1943, Serial No. 504,239

14 Claims. (Cl. 180—19)

This invention pertains to auto tractor units, and more particularly to a power transmission mechanism for alternating the travel movement and controlling the speed thereof.

For illustrative purposes, but with no intent to unduly limit the scope or application of the invention, the reversing power transmission assembly forming the subject matter hereof is herein shown and described in relation to small garden tractors of the type controlled by an operator who walks behind the unit and guides it by upwardly and rearwardly inclined handle bars, which are ordinarily utilized for operation of interchangeable cultivating and harvesting attachments, and for driving a lawn mower or lawn roller and the like, for which purposes it is well adapted.

The present invention, however, is applicable to a wide variety of other power propelled units, such as floor surfacing, scrubbing and polishing machines, cement finishing apparatus, and analogous mechanisms. The reversible transmission assembly, per se, may be embodied in a stationary apparatus wherein a driven part is to be alternately operated in opposite directions.

The object of the invention is to provide a reversible power transmission suitable for tractor units and other apparatus, which may not only be economically manufactured and maintained, but which will be more efficient in use, uniform in operation, of compact form, light weight, capable of being easily and readily controlled, having relatively few operating parts, and be unlikely to get out of repair.

A further object of the invention is to provide a reversible belt drive mechanism, the members of which are operable always in the same direction for actuating a driven member in alternate directions.

A further object of the invention is to provide improved selective means for releasably locking the directional control means in adjusted position.

A further object of the invention is to provide a reversible power drive transmission adjustable for forward or rearward operation at optional speeds and adjustable to neutral or inoperative condition without the use of clutches, variable speed couplings, or shiftable gear connections.

A further object of the invention is to provide power transmission mechanism which is quickly responsive to control means by change of direction of travel and speed of operation, and wherein the operating parts are easily accessible.

A further object of the invention is to provide alternating automatically locking control means for the transmission mechanism.

A further object of the invention is to provide an alternate power drive mechanism having the advantageous structural features and inherent meritorious characteristics and the mode of operation herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings,

Fig. 1 is a side elevation of a garden type tractor unit, from which a carrying wheel has been removed, embodying the reversible power drive mechanism forming the subject matter hereof.

Fig. 2 is an enlarged view, somewhat diagrammatic of the power transmission assembly.

Fig. 3 is a side elevation, similar to Fig. 1, showing adjustment of the control devices for reverse drive.

Fig. 4 is an enlarged detail view of the control lever and its mount.

Fig. 5 is a detail view of a modification of the control lever connection.

Like parts are indicated by similar characters of reference throughout the several views.

In the drawings there is shown a typical garden tractor comprising a main frame or chassis 1, mounted on carrying wheels 2 and supporting a driving motor 3. Extending upwardly and rearwardly from the chassis or main frame 1 is a pair of plow style handle bars 4 by which the tractor may be guided and controlled by an operator who walks behind the unit. The particular construction of the tractor unit and driving motor is not material. The reversible transmission mechanism hereafter described being applicable to various forms of tractor unit or other apparatus and may be actuated from any power source.

On the power shaft 5 of the driving motor 3 is a grooved driving pulley 6. In relatively spaced relation with the driving pulley 6, and with each other, are two driven pulleys 7—7' mounted on the main frame or chassis 1. A pair of endless belts, 8 and 8', which are preferably, but not necessarily of the V type, are disposed about the driving pulley 6 with one extending in relatively inclined relation to each other, about each of the driven pulleys. The belts 8 and 8', are of such length and normally contain sufficient slack that they do not maintain driving engagement with either the driving or driven pulleys, until tightened thereabout.

The belts 8 and 8', are separately tightened by manual adjustment of a movable belt tightener 9 common to the pair of belts located intermediate the adjacent sides of the inclined belts. The belt tightener comprises an idler pulley 9 mounted on a swinging arm 10 pivoted upon the power shaft 5 and hence concentric with the driving pulley 6. To the arm 10, preferably but not necessarily at the opposite side of its pivotal point, one end of an operating link 11 is connected. The opposite end of the link 11 is connected to a short crank arm 12 attached to an oscillatory operating lever 13 pivotally mounted on one of the handle bars 4 within easy reach of a walking operator. The construction is such that the link 11 and crank arm 12 comprise a toggle, which at the limit of swinging motion of the control lever 13 in either direction is advanced slightly beyond dead center, to releasably lock the belt tightener 9—10 in its adjusted position. By movement of the control lever 13 from one position to another the belt tightener is shifted from operative tightening engagement with one belt into like engagement with the other. A spring detent 14 on the handle bar 4 serves to releasably detain the lever in a midstroke or neutral position, by which the belt tightener 9 is temporarily held out of engagement with both belts. This permits the drive pulley 6 to idle, and neither pulley 7 or 7' is rotated. To drive the tractor forwardly or rearwardly as may be desired, the operator swings the lever 13 in appropriate direction to press the idler pulley 9 against the proper belt, to tighten the belt about the driving pulley and the corresponding driven pulley. The drive pulley 6 always rotates in the same direction and consequently the pulleys 7 and 7', are belt driven in the same direction.

The driven pulleys 7 and 7', are interconnected with each other for unison rotation, regardless of which pulley is being driven by the drive pulley 6 and associated belt and regardless of which belt of the pair is slack and inoperative. Motion is transmitted from either pulley 7 or 7' to the other by an intermediate gear train comprising a gear pinion 15 connected to the pulley 7 which intermeshes with a larger gear 16 concentric with, and connected to, a carrying wheel 2. The gear 16 in turn meshes with an idler gear pinion 17 which has intermeshing engagement with a gear 18 connected to and rotating in unison with the pulley 7'. By motion transmitted through the gear train from one pulley 7 or 7' to the other, the direction of rotation of the respective pulleys is reversed. By shifting the belt tightener to connect one pulley or the other with the driving pulley by the selected belt, the gear train may be operated by rotary motion applied to either terminal gear of the train. By tightening the belt 8 to operatively connect the drive pulley 6 with the driven pulley 7, the gears 15, 16, 17 and 18 and the pulley 7' will be rotated in unison. Likewise by tightening the belt 8' the members of the gear train will again be rotated in unison. However due to the interposed idler gear pinion 17 the gear wheel 16 and with it the carrying wheel 2 will be rotated reversely when the driven pulley 7' is driven, and thereby propels the tractor backwardly. Due to the fact that there is one more gear 17 between the carrying wheel gear 16 and the driven pulley 7' than between such carrying wheel gear 16 and the pulley 7, the direction of rotation of the carrying wheel will be reversed, not withstanding the fact that the pulleys 7 and 7' and the terminal members 15 and 18 of the gear train are always belt driven in the same direction by the driving pulley 6. Thus the direction of rotation of the gear 16 and associated carrying wheel 2, to drive the tractor forwardly or backwardly is determined by the tightening of the corresponding belt 8 or 8'. The selection of the belt and consequent direction of travel of the tractor is determined by the direction of oscillation of the control lever 13. Various types of tools or operating attachments may be mounted to the tractor unit for performing sundry operations. Instead of connecting the gear 16 with a carrying wheel, it may be engaged with any other member to be intermittently driven in alternate directions.

In Fig. 5 there is illustrated a modification of the control connection, wherein in lieu of adjustably connecting the link 11 into a slot 10' in the upper end of the swinging arm 10, the link 11 is pivoted at a fixed point to the arm 10 intermediate the shaft 5 and belt tightener roller 9, and at its opposite end the link is adjustably connected in a slot 12' of the control lever arm 12.

This enables the control connection to be variously adjusted to compensate for stretch and wear of the belts. The belts 8 and 8' when of V type will withstand a great amount of wear and use before requiring readjustment.

Stops 12a limit the range of the control lever and shift lever in alternate directions.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A power transmission mechanism for a power tractor, wherein a motor mounted on carrying wheels for operation to and fro in alternating directions, is equipped with upwardly and rearwardly extending handle bars by which an operator walking behind the tractor unit may control its operation and guide its travel, including a motor driven power shaft, a drive pulley on the shaft, a pair of relatively spaced driven pulleys, a pair relatively inclined drive belts for transmitting rotary motion from the drive pulley alternately to each of the driven pulleys, the belts being normally loosely associated in non-driving relation with the pulleys, a belt tightener mounted intermediate the inclined belts, a swinging carrier for the belt tightner by which it is alternately engageable with the respective belts to tighten one of the belts into driving engagement with the driving pulley and a corresponding driven pulley, an operating lever mounted on one of the upwardly and rearwardly extending handle bars, a link connecting the lever with the swinging belt tightener carrier for shifting the belt tightener from operative engagement with one belt into like engagement with the other belt, said lever being movable past dead center relation with the link in opposite directions to releasably lock the belt tightener in operative relation with the respective belts, a detent for releasably retaining the lever in an intermediate position to temporarily hold the belt tightener in neutral position, a gear train including a gear connected with each of the driven pulleys for unison rotation therewith, a gear associated with a carrying wheel, and an idler gear in said gear train between one of the driven pulley connected gears and said carrying wheel associated gear for inducing rotary motion thereof in opposite directions from the respective driven pulleys.

2. A power transmission mechanism for a reversible land vehicle, wherein a driving motor mounted on carrying wheels for to and fro travel movement is provided with rearwardly and upwardly extending handle shafts by which an operator walking therebehind may control and guide the vehicle, including a driving member, a pair of driven members alternately engageable with the driving member for unison operation, a coupling means for independently connecting the respective driven members with the driving member, a shift lever mounted on a handle bar and operatively connected with the coupling means for alternating the connection of the driving member with the respective driven members, a gear train interconnecting the driven members and subject to operating influence of both said members at alternate times, one gear of which train is associated with a carrying wheel of the vehicle, and an idler gear in said gear train connecting the carrying wheel associated gear and one of the driven members, a direct gear driving connection between said carrying wheel associated gear and the other of said driven members, the construction and arrangement being such that the carrying wheel may be optionally driven from either of the driven members but in opposite directions.

3. A power transmission mechanism for a reversible land vehicle wherein a driven motor mounted on carrying wheels for to and fro travel movement is provided with rearwardly and upwardly extending handle shafts by which an operator walking therebehind may control and guide the vehicle, including a motor driven driving pulley, a pair of spaced driven pulleys, a pair of relatively inclined belts for transmitting power, the driving and driven pulleys being normally loosely associated therewith in non-driving relation, an adjustable belt tightener common to the inclined belts and optionally movable out of operative engagement with one belt into such engagement with the other belt, a shift lever mounted on a handle bar, a link connecting the shift lever with the belt tightener for moving the belt tightener into operative engagement with the respective belts alternately, said lever being movable past dead center relation with the link at each limit of its range of operation to releasably lock the belt tightener in its adjusted position, and operative driving connections between the respective driven pulleys and a carrying wheel of the vehicle so constructed and arranged as to optionally drive the carrying wheel in alternate directions.

4. A reversible power transmission mechanism for a tractor unit of the type wherein a motor is mounted on carrying wheels for optional forward and rearward travel motion, including a motor actuated driving pulley, a pair of driven pulleys, a pair of relatively inclined belts for transmitting power from the driving to the driven pulleys, normally loosely associated in non-driving relation therewith, an adjustable belt tightener common to the inclined belts positioned therebetween for movement out of operative engagement with one belt into such engagement with the other belt, a control lever therefor, a link associated with the lever and operative under the influence thereof to alternate the engagement of the belt tightener with the respective belts, said lever being movable past dead center relation with the link at the opposite limits of its range of movement to lock the belt tightener in its adjusted position, and driving connections between each of the driven pulleys and a carrying wheel or tractor unit so constructed and arranged as to drive said carrying wheel alternately in opposite directions.

5. A reversible power transmission system for a motor driven wheeled tractor unit, including a motor driven power pulley, a pair of driven pulleys, a pair of relatively inclined belts for transmitting power from the power pulley to each of the driven pulleys, normally loosely associated therewith in non-driving relation, an adjustable belt tightener common to the inclined belts interposed therebetween and movable out of operative engagement with one belt into like engagement with the other belt, a shift lever operatively connected with the belt tightener and movable past dead center relation with its connection to the belt tightener at the opposite limits of its range of adjustment for temporarily locking the belt tightener in engaging relation with a selected belt, a detent for releasably holding the lever and the belt tightener in an intermediate neutral position wherein neither belt will be operatively tightened, driving connections connecting each of the driven pulleys with a carrying wheel of the tractor unit, so constructed and arranged as to drive the carrying wheel alternately in opposite directions.

6. A reversible power transmission system for a motor driven wheeled tractor unit including a driving member and a pair of driven members to be alternately actuated by the driving member, a control device for optionally connecting the driving member with either one of the driven members, a gear train interconnecting the driven members for unison operation, one member of which gear train is associated with a carrying wheel of the tractor unit, there being an additional idler gear in said gear train between the carrying wheel associated gear and one of the driven members, the construction and arrangement being such that the carrying wheel may be driven in either direction by the driving member through either of the optionally selected driven members and a portion of the gear train.

7. A reversible power transmission system for a motor driven wheeled tractor unit including a driving member, a pair of driven members interconnected with each other for unison operation in opposite directions, a selective device for optionally connecting either driven member with the driving member for unison operation in the same direction, and a carrying wheel of the tractor unit through which the driven members are interconnected, the construction and arrangement being such that the carrying wheel may receive motion from the driving member through either of the driven members when optionally selected, the connection with one of said driven members being operative to drive said carrying wheel in a direction reversely of that of its connection with the other driven member.

8. A reversible power transmission mechanism for a tractor unit, including a driving element, a pair of spaced driven elements, a tractor carrying wheel drive element through which the driven elements are interconnected for unison rotation, a selective device for optionally connecting either of the driven elements with the driving element for unison rotation therewith in the same direction, and means for reversing the direction of rotation of the carrying wheel in accordance with the particular driven element selected for operative connection with the driving element.

9. A reversible power transmission mechanism, including a driving member, a gear train comprising a lineal succession of intermeshing gear members, an intermediate member of the gear train comprising a driven member, a coupling device for optionally connecting either terminal member of the gear train with the driving member for unison rotation therewith in a similar direction, and means for reversing the intermediate driven member of the gear train in accordance with the particular terminal member connected to the driving member.

10. A reversible power transmission mechanism, by which a driven member may be rotated alternately in opposite directions, including a driving member, a gear train of which the driven member is a part for actuating the driven member, a selective device for optionally connecting the driving member with either terminal member of the gear train for rotation in the same direction, and means for reversing the direction of rotation of the driven member by change of terminal member to which the driving member is connected.

11. A reversible power transmission mechanism, by which the direction of rotation of a driven member may be optionally reversed, including a gear train comprising a plurality of intermeshing members, the terminal members of which always rotate in unison with an intermediate member thereof comprising the reversible driven member, a driving member, a pair of normally slack belts for transmitting rotary motion from the driving member to the terminal members of the gear train, a belt tightener common to the belts and movable out of operative engagement with one belt into like engagement with the other belt for transmitting driving power optionally to the terminal members of the gear train, said gear train including one more gear member between the intermediate driven member thereof and one terminal member of the gear train than the number of gear members between said intermediate driven member and the opposite terminal member of said gear train.

12. A power transmission mechanism for a reversible motor driven tractor unit mounted on carrying wheels, including a drive pulley, a pair of spaced driven pulleys, a gear train interconnecting the spaced driven pulleys for unison rotation, a pair of normally loose belts for transmitting rotary motion from the drive pulley selectively to the spaced driven pulleys, a belt tightener common to said belts engageable with the belts alternately for operatively connecting the drive pulley with one of the driven pulleys, the motion of which is transmitted thence through the gear train to the other relatively spaced driven pulley, one of the intermediate members of the gear train being operatively connected with a carrying wheel of the tractor unit, there being one more gear member of said gear train between said intermediate gear member associated with a carrying wheel and one of the driven pulleys than between said intermediate gear member and the opposite driven pulley.

13. A power transmission mechanism for a reversible tractor unit having a carrying wheel, including a drive pulley, a pair of spaced driven pulleys, a pair of normally slack belts for transmitting rotary motion from the driving pulley separately to the driven pulleys, and adjustable belt tightener common to the belts and adjustable out of operative engagement with one belt into like engagement with the other belt, a shift lever for said belt tightener, a link connecting the lever with the belt tightener, the lever being adjustable past dead center relation with the link at opposite limits of its range of movement to temporarily lock the belt tightener in operative engagement with one or the other of the belts, a detent for temporarily maintaining the lever and belt tightener in an intermediate inoperative position, and an operative connection from each driven pulley to a carrying wheel of the tractor unit for propelling the tractor unit alternately in opposite directions in accordance with the belt which is tightened by adjustment of said belt tightener.

14. A power tractor wherein a motor mounted on carrying wheels is equipped with upwardly and rearwardly extending handle bars by which an operator walking behind the unit may control its operation and direction of travel, including a drive pulley on a motor driven power shaft, a pair of relatively spaced driven pulleys, a pair of belts for transmitting from the drive pulley to each of the driven pulleys, one independently of the other, rotary motion of the same direction, said belts being of excessive length whereby they are normally inoperative to transmitting power until tightened, a gear train interconnecting the driven pulleys and actuated by operation of either driven pulley, including a medial gear of the train to which a carrying wheel of the tractor is operatively connected, and belt tightening means for optionally tightening one of the belts independently of the other to drive the carrying wheel either forwardly or backwardly at will.

HARRY W. MOORE.

REFERENCES CITED

The following references are of record in the file of this patent:

UNITED STATES PATENTS

| Number | Name | Date |
|---|---|---|
| 267,364 | Pain | Nov. 14, 1882 |
| 804,980 | Reiss | Nov. 21, 1905 |
| 1,085,379 | Coldwell | Jan. 27, 1914 |
| 1,443,951 | George | Feb. 6, 1923 |
| 2,336,642 | Schreck | Dec. 14, 1943 |

FOREIGN PATENTS

| Number | Country | Date |
|---|---|---|
| 754,470 | Austria | Feb. 10, 1919 |

Certificate of Correction

Patent No. 2,445,797.

July 27, 1948.

HARRY W. MOORE

It is hereby certified that error appears in the printed specification of the above numbered patent requiring correction as follows: Column 5, line 49, claim 3, for "driven" read *driving*; and that the said Letters Patent should be read with this correction therein that the same may conform to the record of the case in the Patent Office.

Signed and sealed this 26th day of October, A. D. 1948.

[SEAL]

THOMAS F. MURPHY,
*Assistant Commissioner of Patents.*